United States Patent [19]

Dearing

[11] 4,269,495
[45] May 26, 1981

[54] CAMERA WITH BACK-UP SHUTTER AND PROVISIONS FOR RECORDING DATA IN CONJUNCTION WITH A PRIMARY IMAGE

[75] Inventor: Le Roy M. Dearing, Studio City, Calif.

[73] Assignee: L. M. Dearing Associates, Studio City, Calif.

[21] Appl. No.: 90,041

[22] Filed: Oct. 31, 1979

[51] Int. Cl.³ ............................................. G03B 17/24
[52] U.S. Cl. ................................................. 354/106
[58] Field of Search ............................ 354/105–109, 354/154, 236

[56] References Cited

U.S. PATENT DOCUMENTS

| 2,992,602 | 7/1961 | Heden | 354/154 |
| 4,025,932 | 5/1977 | Miyagawa | 354/106 X |

Primary Examiner—John Gonzales
Attorney, Agent, or Firm—Fulwider, Patton, Rieber, Lee & Utecht

[57] ABSTRACT

A single lens reflex camera having a back-up shutter, in addition to an exposure timing shutter, that covers the film to prevent it from being exposed while the photographer is viewing the subject through the main lens. An illuminated dated image is generated within the camera body and projected onto the emulsion side of the film in conjunction with primary image. A pivotable panel that forms part of the back-up shutter has a cutaway area through which a portion of the projection system for the data image passes as the panel moves between open and closed position. The projection system includes a frame engaged by the adjacent edge of the back-up shutter panel in a light-tight manner when the panel is in its closed position.

12 Claims, 6 Drawing Figures

U.S. Patent    May 26, 1981    4,269,495
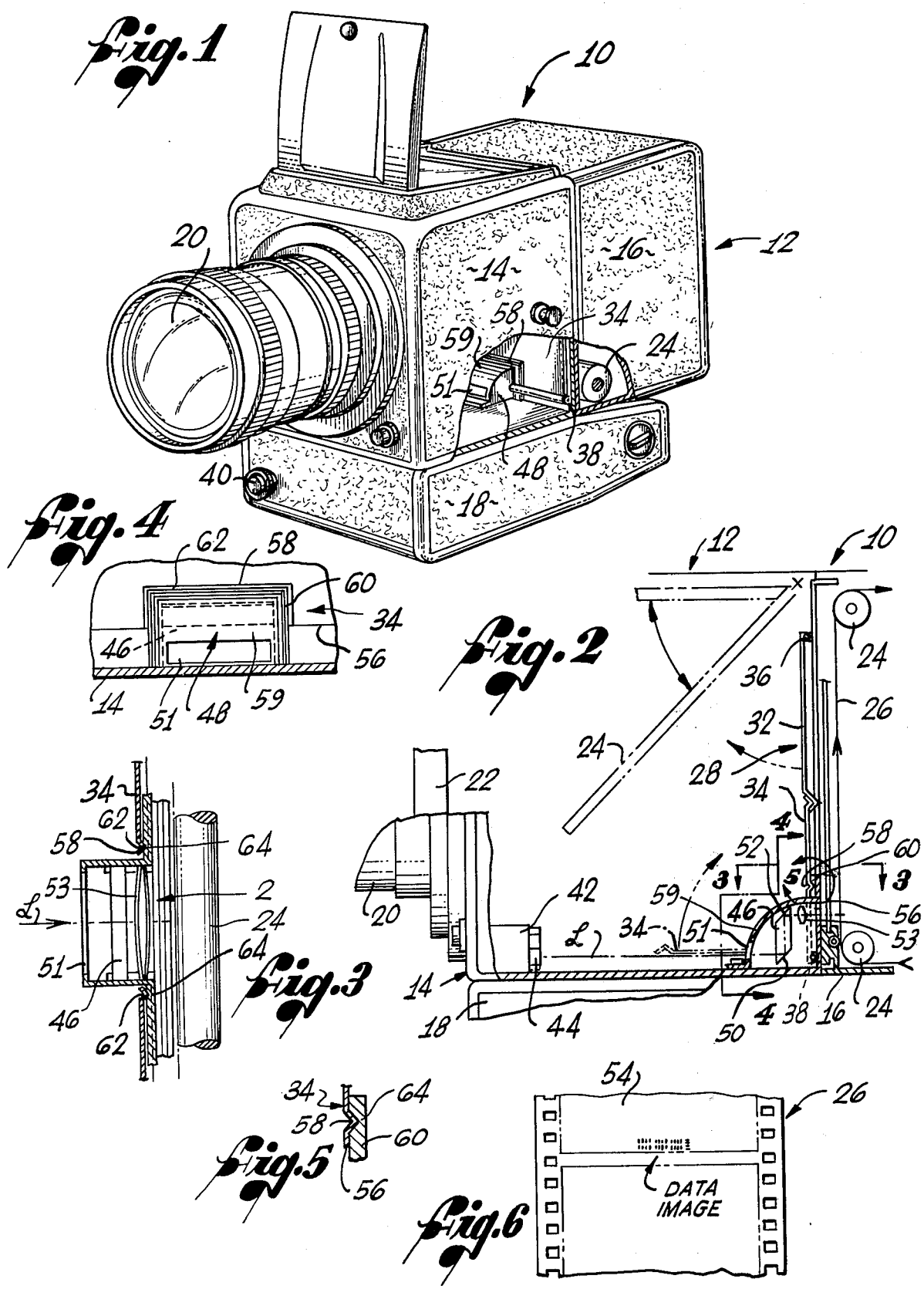

CAMERA WITH BACK-UP SHUTTER AND PROVISIONS FOR RECORDING DATA IN CONJUNCTION WITH A PRIMARY IMAGE

FIELD OF THE INVENTION

The present invention relates to photography, and, more particularly, to cameras having provisions for recording data images in conjunction with primary images received through the main lens.

BACKGROUND OF THE INVENTION

It is often desired to record data on photographic film in conjunction with primary images, the data being arranged so that it is adjacent to or superimposed on the primary images of the individual frames to which the data relates. For example, one may wish to record the time at which the exposure was made, the aperture and shutter setting, and the film speed. Alternatively, one may wish to identify the subject photographed on a particular frame by coded indicia. In aerial photography, one may wish to record the precise latitude and longitude at which a photograph is taken along with the time of day.

Conventionally, data is recorded by providing an electronically controlled, solid state, illuminated display arranged to project an image onto the emulsion side of the film or onto the back of the film. The display itself is often positioned within the body of the camera and driven by an external signal source.

The installation of a data recording system within a camera can be difficult because of the very limited space available. It is particularly problematic in the case of single lens reflex cameras that employ back-up shutters. The purpose of these back-up shutters is to cover the film and prevent it from being exposed while the photographer is viewing the subject through the main lens. Back-up shutters are usually of the barn door type and, in moving between their open and closed positions, the shutter panels sweep most of the area within the camera body in which a data display device might be positioned. To date, no satisfactory arrangement has been devised for positioning such a data display within a small, compactly designed camera so that the data image is projected onto the emulsion side of the film.

It is a principle objective of the present invention to provide a camera construction that permits a data image to be recorded from the emulsion side of the film without interfering with the functioning of the back-up shutter.

SUMMARY OF THE INVENTION

A camera in which the invention resides has a body on which a main lens is mounted to expose film held in a film plane. It includes an exposure timing shutter and at least one back-up shutter panel movable about a pivot axis between a closed position covering the film and an open position exposing the film.

A data recording device is mounted within the body between the lens and the film plane to provide an illuminated data image or other secondary image to be recorded on the film. This device includes a light-blocking frame that extends about an area of the film plane on which the data image is to be recorded. The shutter panel defines a cutaway area shaped and dimensioned to permit at least a portion of the display presentation device to pass through as the shutter panel moves between its open and closed positions. An edge portion of the shutter panel extending along the cutaway area is arranged to engage the frame in a light-tight manner when the shutter panel is in its closed position. It is preferable that the data display be capable of providing a variable alpha-numeric image in response to an external electrical input signal.

According to one arrangement described below, the image is projected along a path that extends beneath the shutter panel in its open position to a prism adjacent the film plane. The prism displaces the image upwardly onto the desired portion of the film. Preferably, the frame surrrounds the prism and is disposed adjacent to the film plane. A data lens is disposed between the prism and the film.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective view of a camera in which the present invention is incorporated, a portion of one side wall being broken away to expose part of the data recording device;

FIG. 2 is a fragmentary, vertical, cross-sectional, side view of a portion of the camera that includes the data recording device;

FIG. 3 is a fragmentary, cross-sectional view taken along the line 3—3 of FIG. 2, showing the data image projection components;

FIG. 4 is a fragmentary cross-sectional view taken along the line 4—4 of FIG. 2, showing the engagement between one of the shutter panels and data image projection device;

FIG. 5 is an enlarged, fragmentary, cross-sectional view of the portion of FIG. 4 indicated by the arrow 5 in FIG. 2; and FIG. 6 is a fragmentary, plane view of the film on which the data is recorded.

DESCRIPTION OF THE PREFERRED EMBODIMENT

A camera 10, constructed in accordance with the present invention and shown in FIG. 1 of the accompanying drawings, is a modification of a commercially available Hasselblad model 500EL/M. It is a single lens reflex camera that uses 2 ¼" by 2 ¼" film. While the invention is explained with reference to this particular camera 10, it will be understood that the principles set forth here can be applied to other cameras of generally similar construction.

In general, the camera 10 includes a body 12 formed by a main section 14, a magazine section 16 and a motor drive unit 18. A main lens 20 is removably mounted on the front of the main body section 14, a diaphram (not shown) and a between-the-lens exposure timing shutter 22 being part of the detachable lens structure. When the exposure timing shutter 22 is open, the subject to be photographed can be viewed through the lens 20 via a movable mirror 24 in the conventional manner. A pair of film guide rollers 24 positions a film 26 at the front of the magazine section 16 across the back of the main body section 14.

Because the image is viewed through the open exposure timing lens 20, the camera 10 requires a back-up shutter 28 to prevent the film 26 from being exposed while the photographer is viewing the subject through the main lens 20.

The back-up shutter 28 is of the barn door type including an upper panel 32 and a lower panel 34. These panels 32 and 34 are pivotable on upper and lower axles 36 and 38 that extend horizontally across the back of the main body section 14. They swing between open positions at which they extend horizontally along the top and bottom of the main body section 14 (as shown in phontom lines in FIG. 2 in the case of the lower panel 34) and closed positions (shown in FIG. 1 and in solid lines in FIG. 2) in which they extend vertically adjacent to the film plane to cover the film 26. When in their closed positions, the shutter panels 32 and 34 interlock in a light tight manner along their adjacent horizontal edges.

When the camera 10 is in the viewing mode, with the mirror 24 extending downwardly into the main body section 14 at a 45 degree angle, as shown in FIG. 2, the exposure timing shutter 22 is open to permit the subject to be viewed through the main lens 20. The back-up shutter 28 is closed to prevent exposure of the film 26. When the primary image is recorded on the film 26, by depressing a shutter release button 40, the mirror 24 moves into a horizontal position against the top of the main body section 14 and the exposure timing shutter 22 closes for a brief instant. The back-up shutter 30 then opens so that the film 26 can be exposed (the upper shutter panel 32 underlying the mirror 14) and the exposure timing shutter 22 opens to expose the film 26 and closes again.

It is desired to generate a data image to be projected on the emulsion side of the film 26. There is not, however, enough room to position a suitable illuminated display generating device within the forward portion of the main body section 14 and to project a recordable image across the main body section onto the film 26. A display arrangement that would fit in the forward portion of the body section 14 and project the image across the open shutter panels 32 and 34 to the film 26 would use the illumination of the display inefficiently and would not produce a satisfactory image in the film plane. This is especially true when a high speed film is transported at short inervals. It is, therefore, necessary to either move the data image generating portion of the display closer to the film plane or the position a data lens close to the film plane to focus the data image. In an unmodified camera, however, it is not possible to position any part of the data recording device close to the film plane, because of the large area adjacent to the film plane that is swept by the shutter panels 32 and 34 as they move between their open and closed positions.

According to the present invention, a display generating device 42 is positioned transversely across the bottom front edge of the main magazine section 14. It includes an array of LED matrices 44 that are each capable of presenting a single letter, or digit in response to an external electronic input signal. It should be understood, however, that the invention is not limited to a particular type of display 42. For example, an externally illuminated liquid crystal display could be used. Alternatively, all or part of the display could be in the form of a replaceable printed card that would present the same data image to each successive frame of the film 26.

The preferred arrangement for recording the data image also includes a prism 46 disposed within a housing 48 at the rear of the main body section 14 adjacent to the film plane. The prism 46 has a lower reflection surface 50 that receives the light from the display 42 that travels a light path L extending substantially horizontally along the bottom of the main body section 14 beneath the lower shutter panel 34 (when the panel is in its open position) and enters a window 51 in the bottom of the housing 48. The lower reflection surface 50 is set at a 45 degree angle to the horizontal to the reflect the data image upwardly to a second reflection surface 52, causing it to be reflected horizontally toward a portion of the film 26 just above the lower film guide roller 24. A lens 53 is positioned between the prism 46 and the film 26 to focus the data image. Positioning the lens 53 close to the film 26 permits a sharp bright image that could not be attained by a longer focal length lens disposed beyond the reach of the lower shutter panel 34. The data image is thus sharply recorded in superimposition to the primary image along the lower edge of a film frame 54, as shown in FIG. 6.

To accomodate the prism 46 and its housing 48, the lower shutter door 34 has a rectangular cutaway portion adjacent its lower edge 56 defying by a three sided edge portion 58. The housing 48 has an arcuate, leading surface 59 with the same radius of curvature as the path followed by the top of the cut-away so that is passes through the cut-away as the panel 34 pivots on its axle 38. When the lower shutter panel 34 is in its closed position, the edge 58 of the cut-away interlocks with a frame 60 that surrounds the housing 48 adjacent to the film 26. A concave ridge 62 extending along the edge 58 of the panel 34 interlocks with a mating convex surface 64 on the frame 60 to form a light-tight seal.

it will be understood that many variations in the arrangement of the data recording components are possible. For example, the display device 42 itself, if made slightly smaller in comparison to the size of the camera 10, could be positioned within the housing 48. The image could be shifted toward one edge of the film 26. If necessary, the central portion of the axle 38 on which the lower shutter panel 34 pivots can be removed to accomodate a data recording arrangement in which the data image is lowered with respect to the film frame being exposed. It is preferable to use either no reflection surfaces or an even number of reflection surfaces so that a non-inverted image is projected onto the film 26, assuming that the image presented by the display 42 is not inverted.

It will be apparent from the description above, that the present invention provides for the recording of data on the emulsion side of the film 26 within a camera 10 having a back-up shutter. This objective is accomplished without adding to the external size of the camera 10 and without interfering with the other functions of the camera.

While a particular form of the invention has been illustrated and described, it will be apparent that various modifications can be made without parting from the spirit and scope of the invention.

I claim:

1. In a single lens reflex camera having a body, a main lens mounted on said body, means for positioning a film in a film plane within said body to be exposed through said main lens so that a primary image is formed on said film an exposure-timing shutter disposed in front of said film plane, and at least one back-up shutter panel movable about a pivot axis beteen a closed position covering said film plane and an open postion exposing said film plane, the improvement comprising: data image recording means mounted within said body between said lens and said film plane for providing an illuminated data image to be recorded on said film in conjunction with said primary image, a light-blocking frame extending around an area of said film plane on which said data image is to be recorded, said shutter panel defining a cutaway area shaped and dimensioned to permit at least a portion of said data image recording means to pass therethrough as said shutter panel moves between said open and closed positions, said shutter panel also having an edge portion extending along said cutaway area and arranged to engage said frame in a light-tight manner when said shutter panel is in said closed position.

2. The camera of claim 1 wherein said data recording means comprises display means for generating a variable data image in response to an electrical input signal.

3. The camera of claim 2 wherein said data recording means further comprises projection means for projecting said data image onto said film.

4. The camera of claim 3 wherein said projection means includes a prism at least partially surrounded by said frame.

5. The camera of claim 4 wherein said display means and said projection means are arranged so that said data image follows a light path from said display means to said projection means that extends under said shutter panel when said shutter panel is in said open position.

6. The camera of claim 4 wherein said projection means comprises a prism having two parallel reflection surfaces therein.

7. The camera of claim 1 wherein said data recording means includes a prism with two parallel reflections therein.

8. The camera of claim 7 wherein said data recording means further comprises a lens disposed between said prism and said film plane.

9. The camera of claim 1 wherein said data recording means extends toward said film to said pivot axis and said frame is aligned with said pivot axis.

10. The camera of claim 1 wherein said portion of said data recording means that passes through said shutter panel includes a lens.

11. In a single lens reflex camera having a body, a main lens mounted on said body, means for positioning a film to be exposed through said main lens in a film plane within said body so that a primary image can be formed on said film, an exposure-timing shutter disposed in front of said film plane, and first and second back-up shutter panels each movable about a pivot axis between a closed position covering said film plane and an open position perpendicular to said film plane, the improvement comprising:

display means disposed within said body between said main lens and said film plane for generating an illuminated variable data image in response to an externally originated electrical input signal; and projection means for projecting said data image onto said film arranged so that said image follows a light path extending from said display means under said first shutter panel to said projection means when said first shutter panel is in said open position, said projection means comprising a prism adjacent said film plane having two parallel reflection surfaces therein, a lens between said prism and said film plane, and a frame extending around said prism adjacent to said film plane;

said first shutter panel having an edge portion defining a cutaway area shaped and dimensioned to permit at least a portion of said prism to pass there through as said first shutter panel moves between said open and closed positions, said edge portion being arranged to engage said frame in a light-tight manner when said first shutter panel is in said closed position.

12. In a single lens reflex camera having a body, a main lens mounted on said body, means for positioning a film in a film plane within said body to be exposed through said main lens so that a primary image is formed on said film, an exposure-timing shutter disposed in front of said film plane, and at least one back-up shutter panel movable about a pivot axis between a closed position covering said film plane and an open position exposing said film plane, the improvement comprising: secondary image projection means mounted within said body for presenting an illuminated secondary image to be recorded on said film in conjunction with said primary image, a light-blocking frame extending around an area of said film plane on which said data image is to be recorded, said shutter panel defining a cutaway area shaped and dimensioned to permit at least a portion of said secondary image projection means to pass therethrough as said shutter panel moves between said open and closed positions, said shutter panel also having an edge portion extending along said cutaway area and arranged to engage said frame in a light-tight manner when said shutter panel is in said closed position.

* * * * *